United States Patent [19]

Fahlen

[11] 4,393,505
[45] Jul. 12, 1983

[54] GAS DISCHARGE LASER HAVING A BUFFER GAS OF NEON

[75] Inventor: Theodore S. Fahlen, San Jose, Calif.

[73] Assignee: GTE Sylvania Incorporated, Stamford, Conn.

[21] Appl. No.: 371,637

[22] Filed: Nov. 3, 1981

Related U.S. Application Data

[63] Continuation of Ser. No. 927,428, Jul. 24, 1978, abandoned.

[51] Int. Cl.³ .................................................. H01S 3/22
[52] U.S. Cl. .......................................... 372/57; 372/60
[58] Field of Search .............................. 372/55, 57, 60

[56] References Cited

U.S. PATENT DOCUMENTS 3,934,211  1/1976  Sucov et al. ............................ 372/56
4,307,351  12/1981  Oomen et al. ........................ 372/55

OTHER PUBLICATIONS

D. E. Rothe et al., "Analysis of a Spark-Preionized Large-Volume XeF and KrF Discharge Laser", *Optics Communications*, vol. 22, No. 3, Sep. 1977, pp. 265–268.
M. Rokni et al., "Absorption in Ne- and Ar-Rich XeF* Laser Mixtures", Appl. Phys. Lett., vol. 32, No. 10, May 15, 1978, pp. 622–624.

*Primary Examiner*—James W. Davie
*Attorney, Agent, or Firm*—John F. Lawler

[57] ABSTRACT

The output power and efficiency of a gas discharge laser is substantially improved by the substitution of neon (Ne) for helium (He) as a buffer in the lasing medium. One embodiment of the invention is a pulsed excimer laser having a lasing gas comprising a mixture of krypton (Kr) and fluorine ($F_2$). Use of Ne with the KrF excimer lasing medium further enables advantageous utilization of corona wire pre-ionization to initiate the main discharge of this type of laser.

4 Claims, 4 Drawing Figures

GAS DISCHARGE LASER HAVING A BUFFER GAS OF NEON

This is a continuation of application Ser. No. 927,428, filed July 24, 1978 now abandoned.

BACKGROUND OF THE INVENTION

This invention relates to lasers and more particularly to an improved gas discharge laser.

One type of gas discharge laser is the excimer laser. An excimer laser has a lasing gas with a molecule which exists only in the excited state. The atoms comprising the gas, for example, krypton (Kr) and fluorine ($F_2$) exist as such in the laser prior to excitation and, when excited by an electric discharge, combine to form the molecule KrF which emits photons at its characteristic wavelength 249-nm while dropping from the upper energy state to the lower or ground state. Upon reaching the ground or terminal state, the molecule disassociates into its constituent atoms. Accordingly, saturation at the lower energy state cannot occur in an excimer laser which overcomes power output limitations attributed to this cause. This laser therefore has considerable promise in generating outputs at visible and ultraviolet wavelengths which have utility in such applications as isotope separation, nuclear fusion and photochemistry. Other excimer and excimer-like lasers utilize gas lasing media consisting of argon (Ar) and fluorine ($F_2$), xenon ($X_e$) and $F_2$, Xe and bromine ($Br_2$), mercury (Hg) and $Br_2$, Hg and chlorine ($Cl_2$), and Xe and $Cl_2$, which form the excimer or excimer-like substances argon fluoride (ArF), xenon fluoride (XeF), xenon bromide (XeBr), mercury bromide (HgBr), mercury chloride (HgCl) and xenon chloride (XeCl), respectively.

In the operation of a high pressure pulsed excimer laser, good electric discharge uniformity is essential to efficient laser performance. In order to provide a uniform high voltage discharge in high pressure gases, the gas must be pre-ionized immediately prior to the application of the main discharge pulse. "Pre-ionization" means that a uniform ion or electron cloud is generated in the gas in the discharge region which acts to uniformly "seed" the main discharge. This uniform ion cloud tends to prevent the formation of arcs or streamers when the main discharge occurs, thereby providing for a more spatially uniform discharge.

In excimer lasers, as in other gas discharge lasers, it is necessary to provide a buffer gas in the gas mixture in order initially to support the discharge since, by definition, the excimer molecule exists only in the excited state. In prior practice, the buffer gas used has been helium (He) because it is chemically inert, inexpensive, readily available, has a high ionization potential and forms stable low pressure discharges. It is light and has a high specific heat so that it is used to rapidly remove excess discharge heat (as in the $CO_2$ laser discharge for instance). In conventional pulsed-discharge high-pressure excimer lasers, discharge uniformity is enhanced by irradiating the discharge region with ultraviolet (u.v.) radiation generated by an array of sparks. The u.v. radiation from these spark discharges ionizes the gas in the main discharge volume providing the required pre-ionization. The operation of the laser requires that the spark discharge occur some time prior to the main discharge; that is, energization of the spark array is required to occur some time (typically less than 1 microsecond) prior to application of the main voltage pulse to the primary electrodes in the system. Some delay between the spark array discharge and main voltage pulse is required to allow time for the u.v. intensity from the sparks to reach maximum value.

While the spark array technique provides sufficient pre-ionization to permit effective use of He as a buffer gas, it has several disadvantages. It requires separate energy storage cicuitry which lowers the overall laser efficiency. It requires separate timing circuitry to delay the main discharge pulse some hundreds of nanoseconds after the initiation of the spark discharges. Further, the spark array electrodes tend to erode away as they are discharged, the eroded material and the freshly exposed electrode material thereby contributing to gas contamination and reduction in laser efficiency.

OBJECTS AND SUMMARY OF THE INVENTION

A general object of the invention is the provision of a gas discharge laser having increased power and efficiency.

Another object is the provision of an excimer laser capable of higher output power at increased efficiency compared to conventional excimer lasers.

A more specific object is the provision of such an excimer laser that requires reduced pre-ionization energy, thereby enabling use of a more advantageous pre-ionization circuit.

These and other objects of the invention are achieved by utilizing neon (Ne) as the buffer gas in the gas discharge laser. More particularly, in a preferred embodiment of the invention, Ne is substituted for He as a buffer gas in an excimer or excimer-like laser having a lasing gas selected from a group consisting of ArF, XeF, XeBr, HgBr, HgCl, XeCl and KrF. Use of Ne as the buffer gas has substantially increased both the output power and the efficiency of the laser. In addition, Ne has some properties (possibly its relatively low ionization potential) that enable advantageous utilization of the corona wire pre-ionization technique in operating the excimer laser.

DESCRIPTION OF PREFERRED EMBODIMENT

Figure 1:
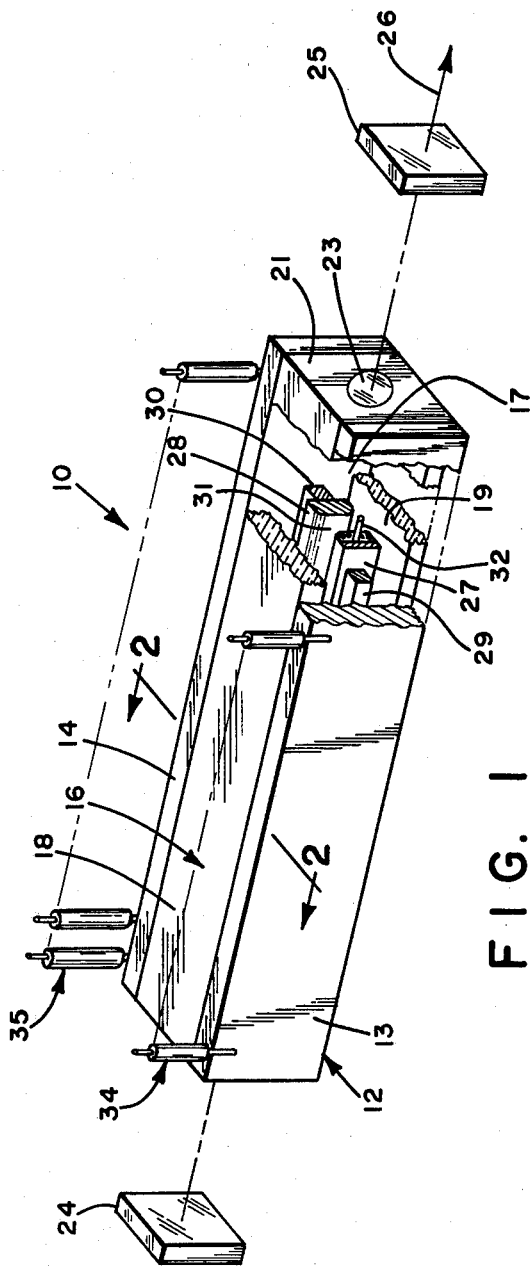
FIG. 1 is a perspective view of an excimer laser embodying this invention.
Figure 2:
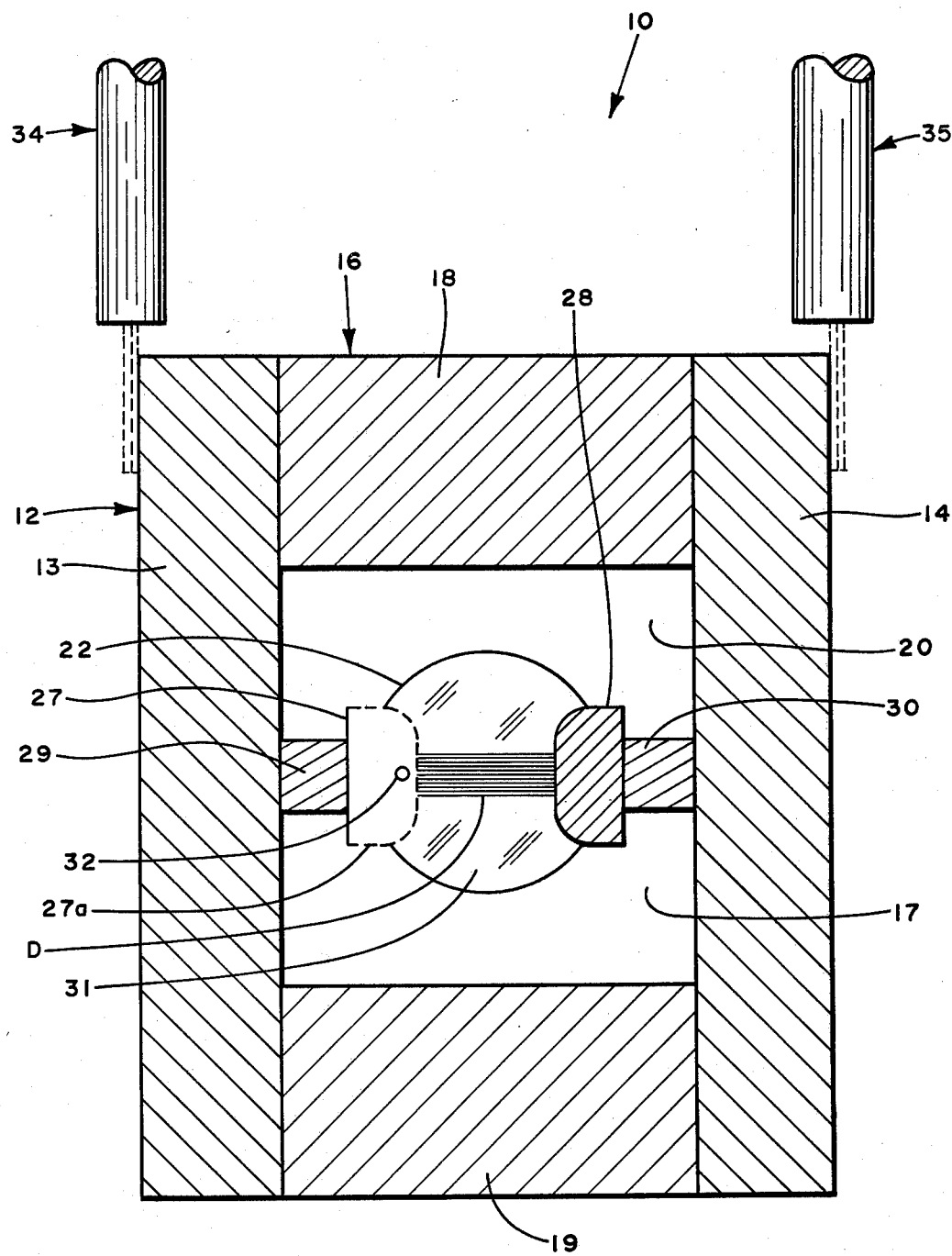
FIG. 2 is a greatly enlarged simplified transverse section of the laser as viewed along line 2—2 of FIG. 1.

While the invention has application with utility and advantage to gas discharge lasers in general wherein He is used as a buffer gas, the following will describe the invention as embodied in one of such class of lasers, namely, the excimer laser. Referring now to the drawings, an embodiment of the invention is shown in FIGS. 1 and 2 as an excimer laser 10 having a sealed housing 12 comprising metallic side plates 13 and 14 and an electrically non-conductive body 16 to which side plates 13 and 14 are secured and sealed to provide a gas-tight internal chamber 17. By way of example, plates 13 and 14 may be aluminum and body 16 may be an epoxy manufactured by Hysol Division, Dexter Corporation, Pittsburg, Calif. Body 16 has a top wall 18, a bottom wall 19 and end walls 20 and 21 which contain quartz windows 22 and 23, respectively, or the like which are sealed in place in alignment with the electric discharge zone 31 described below. The lasing medium is a gas contained in chamber 17 and comprises a mixture which produces an excimer upon excitation. This gas is selected from the group consisting of Ar and $F_2$, Xe and $F_2$, Xe and $Br_2$, Hg and $Cl_2$, Xe and $Cl_2$, and Kr and $F_2$, and when excited becomes the excimers or excimer-like substances ArF, XeF, XeBr, HgBr, HgCl, XeCl, and KrF, respectively. The halogens $Br_2$, $Cl_2$ and $F_2$ may be derived from compounds, for example, $BrCCl_3$.

Optical components such as mirrors 24 and 25 at opposite ends of body 16 in alignment with windows 22 and 23 and discharge zone 31 define the optical cavity for the laser 10. Mirror 24 is totally reflective and mirror 25 is partially transmissive so that laser output 26 is derived from the latter.

In order to produce an electric discharge D, within chamber 17, see FIG. 2, elongated electrodes 27 and 28 are disposed to extend parallel to and spaced from each other coextensive with chamber 17 and are mechanically and electrically connected by bars 29 and 30, respectively, to side plates 13 and 14, respectively. The space 31 between electrodes 27 and 28 is the discharge zone of the laser. Electrode 28 preferably is a solid aluminum bar having curved inner edges. Electrode 27 is similarly shaped but is hollow and comprises a perforate sheet or screen 27a indicated in broken lines in FIG. 2. An insulated pre-ionization wire 32 is disposed coextensively within electrode 27 for the purpose of pre-ionizing the gas mixture in chamber 17 as described below.

Energy storage for the pulse forming network is provided by arrays 34 and 35 of coaxial cables suitably electrically connected to plates 13 and 14. By way of example, one embodiment of the invention utilizes arrays consisting of 80 coaxial cables, each approximately 2.5 meters long providing a total capacitance of 38 nf.

Figure 3:
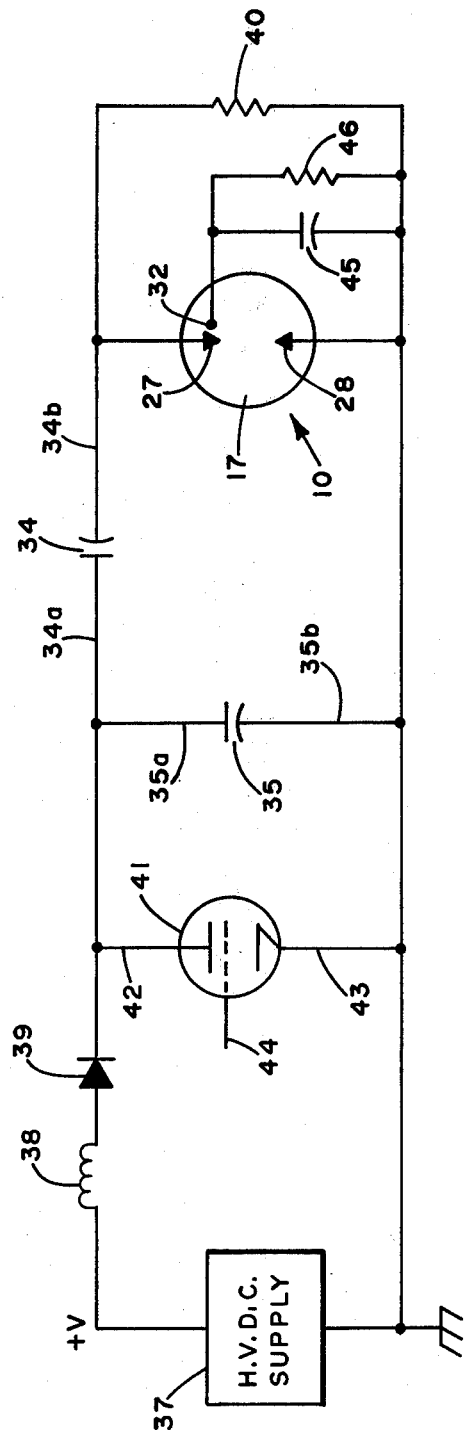
FIG. 3 is a schematic diagram of the electrical circuit for the laser of FIG. 1.

The pulse-forming network is illustrated schematically in FIG. 3 and comprises a high voltage d-c power supply 37 with its negative terminal grounded and its positive terminal connected through an inductance 38 and diode 39 to joined terminals 34a and 35a of the coaxial cable energy storage capacitors 34 and 35, respectively. The other terminal 35b of capacitor 35 is connected to ground while the corresponding terminal 34b of capacitor 34 is connected to ground through resistor 40. Cathode 27 of laser 10 is connected to the terminal 34b of capacitor 34 and anode 28 is similarly connected to the terminal 35b of capacitor 35 so that electrodes 27 and 28 are in the discharge path of these capacitors.

In order to trigger the discharge in the laser, an electronic switch 41, such as a thyratron, is connected on one side 42 between diode 39 and capacitors 34 and 35 and on the other side 43 to ground. A trigger voltage applied to control terminal 44 of switch 41 causes capacitors 34 and 35 to discharge across resistor 40 increasing the voltage across laser electrodes 27 and 28 to the breakdown voltage of the gas in chamber 17. The voltage developed in this manner across the laser electrodes is up to 50% higher than the capacitor charge voltage; the amount of voltage enhancement depends on the rate of rise of the voltage, the gas mix and the gas pressure.

The complete circuit for the corona pre-ionizer wire 32 consists of capacitor 45 and resistor 46 connected in parallel between wire 32 and ground. Because of resistor 46, wire 32 is returned to the potential of anode 28 after each laser discharge pulse. When switch 41 is triggered and the voltage of cathode 27 increases (as shown, negatively with respect to the grounded anode and corona wire) and a corona discharge forms between wire 32 and cathode 27. This corona discharge provides initial ions and electrons at the cathode surface ("pre-ionization") and establishes a uniform discharge between the laser electrodes. The stray capacitance of the corona wire may also be used, in which case wire 32 is connected directly to ground and capacitor 45 and resistor 46 are eliminated.

The use of an insulated wire located near the cathode and held at anode potential for purposes of pre-ionizing a gas is well known in the prior art and does not per se constitute this invention. Such pre-ionization technique is described, for example, in an article by applicant entitled, "High-pulse-rate 10-W KrF Laser", published in Journal of Applied Physics, January 1978, pages 455-456.

In accordance with this invention, Ne instead of He is utilized as the buffer gas in a gas discharge laser. Ne has a lower ionization potential than He, i.e., 21.5 volts for Ne compared to 24.5 volts for He. Ne also has a higher Townsend ionization coefficient (rate of electron production) than does He. It may be these characteristics of Ne that permit the corona preionization technique with wire 32 to be utilized in the operation of the excimer laser as described above. If He is substituted for Ne as the buffer gas in the above described excimer laser using the corona wire pre-ionization technique and under the same operating parameters, the main discharge is spatially non-uniform and the laser efficiency is substantially reduced.

The reason for the better performance of Ne compared to He in a corona discharge environment is not fully understood. Because of its higher ionization potential, He provides a higher breakdown voltage for the excimer, a factor which has been generally regarded as advantageous in producing higher output powers from these lasers. It is postulated that such higher discharge voltages may result in non-uniform discharges and that the lower voltages obtained with Ne are compensated by the generation of a more uniform discharge. It is also possible that Ne aids in laser gas kinetics in a manner unlike that with He. The advantages of using Ne with the corona wire pre-ionization technique may also be due to the greater amount of gas that is pre-ionized. When Ne is used as a buffer gas with the spark array pre-ionization technique, there is a 20% increase in laser output power over a similar arrangement using He.

Figure 4:
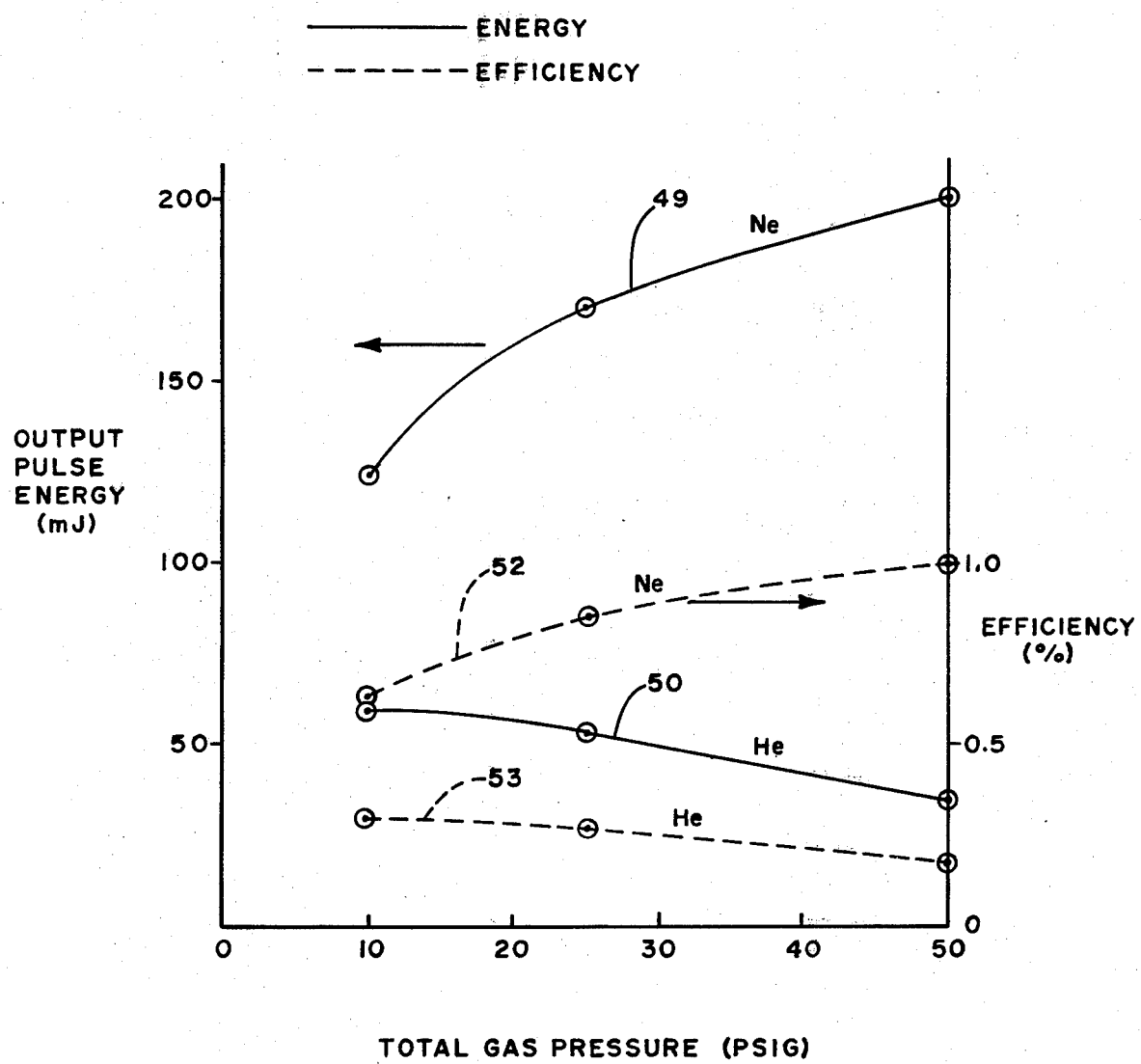
FIG. 4 shows comparative performance curves of the laser embodying this invention and of a prior art laser.

FIG. 4 shows performance curves of two KrF excimer lasers, one using corona wire pre-ionization and Ne as the buffer gas and the other the same using He. Solid line curves 49 and 50 illustrate the power performance output of this laser for Ne and He buffer gases, respectively, when plotted against absolute gas pressure. The broken line curves 52 and 53 show the efficiency of the laser for Ne and He buffer gases, respectively. In this test, the discharge length (length of electrodes 27 and 28) was 72 cm, the gas mix consisted of 5 torr $F_2$, 50 torr Kr and the balance Ne, the discharge frequency was 2 Hz, power supply output was 18 KV, total capacitance of cable arrays 34 and 35 was 38 nf and cable voltage immediately prior to discharge was 32 KV. When He was substituted for Ne in this laser, the pulse energy decreased from 125 mJ at 10 psig to 16 mJ, from 170 mJ at 25 psig to 55 mJ, and from 200 mJ at 50 psig to 35 mJ. With 25% of Ne replaced with He at a total gas pressure of 132 psig, the output pulse energy decreased from 170 mJ to 50 mJ. At a total pressure of 50 psig, the output pulse energy decreased linearly as Ne was exchanged for Ne; with 60% of the Ne replaced with He, the output pulse energy was 60% less than that of that obtained with Ne alone.

Observation of the discharge D indicates that a multitude of streamers is present when He is used whereas with Ne, the discharge appears more uniform and arc-free. It should be noted that the laser breakdown voltage is approximately 20% higher with He than with Ne.

From the above description, it will be understood that efficient, high pressure, high pulse energy KrF laser operation is obtained utilizing Ne as a buffer gas. It is significant to note that the foregoing test results were obtained using electrical components compatible with high pulse rate operation. In order to achieve high pulse rate operation, it is necessary merely that gas be recirculated through the electrode region as described in the aforementioned publication by applicant.

While the invention has been described in conjunction with its embodiment in an excimer laser, the utility of the invention extends to any gas discharge laser which heretofore has employed He as a buffer gas. The reason why the substitution of Ne for He as the buffer gas enables such laser to operate with substantially increased power output and efficiency is not known at this time. The scope of the invention, therefore, is set forth in the appended claims.

What is claimed is:

1. In an excimer laser comprising a chamber, spaced electrodes in said chamber defining a discharge zone therebetween, a source of d-c power, energy storage capacitor means electrically connected to said electrodes and to said source and adapted to be charged by the latter, switch means electrically connected between said capacitor means and said electrodes and operable to apply the charge voltage of said capacitor means across said electrodes, a lasing gas mixture in said chamber having a lasing gas selected from the group consisting of Ar and $F_2$, Xe and $F_2$, Xe and $Br_2$, Hg and $Br_2$, Hg and $Cl_2$, Xe and $Cl_2$ and Kr and $F_2$, said electrodes producing an electric discharge in said gas in said zone when said switch means is actuated whereby to convert said gas mixture to ArF, XeF, XeBr, HgBr, HgCl, XeCl and KrF, respectively, and optical means aligned with said discharge zone defining a laser cavity, the improvement consisting of a buffer gas of Ne in said mixture.

2. The laser according to claim 1 in which said lasing gas comprises KrF.

3. The laser according to claim 2 with at least one insulated ionization wire spaced closely to one of said electrodes and electrically connected to the other electrode whereby application of said charge voltage to said electrodes causes said wire to pre-ionize said buffer gas and to simultaneously induce the electric discharge between said electrodes.

4. The laser according to claim 3 in which said switch means comprises a thyratron.

* * * * *